Figure 1:
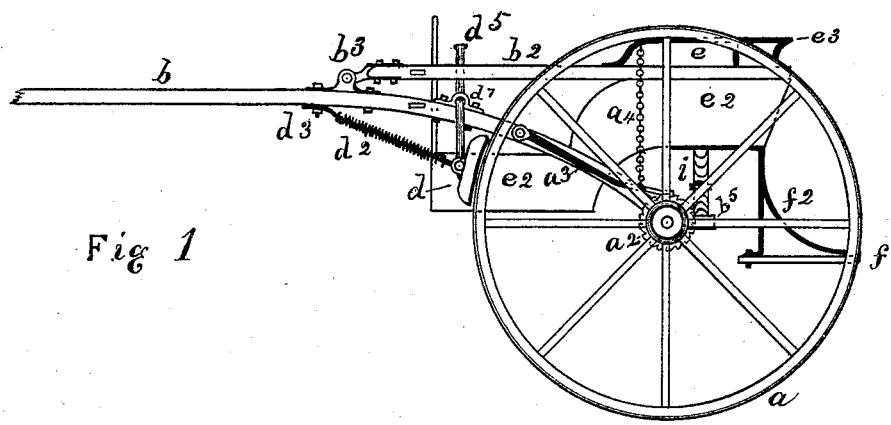

(No Model.) 2 Sheets—Sheet 1.

F. P. McKEON.
TWO WHEELED VEHICLE.

No. 343,484. Patented June 8, 1886.

Witnesses
Inventor
Frank P. McKeon
by Abraham and Mayer
attorneys (No Model.) 2 Sheets—Sheet 2.

F. P. McKEON.
TWO WHEELED VEHICLE.

No. 343,484. Patented June 8, 1886.

Witnesses
Saml C Jacobson
Andrew F. Whitaker

Inventor
Franks P. McKeon
by Abraham and Mayer
attorneys.

UNITED STATES PATENT OFFICE.

FRANK P. McKEON, OF CHICAGO, ILLINOIS.

TWO-WHEELED VEHICLE.

SPECIFICATION forming part of Letters Patent No. 343,484, dated June 8, 1886.

Application filed March 29, 1886. Serial No. 197,010. (No model.)

*To all whom it may concern:*

Be it known that I, FRANK P. McKEON, a citizen of the United States, residing at Chicago, in the county of Cook and State of Illinois, have invented a new and useful Improvement in Horse-Breaking Vehicles, of which the following is a specification.

My invention relates to horse-breaking vehicles, whereby such vehicle can be readily stopped.

To the accomplishment of my purpose my invention consists of novel brake attachments and their controlling mechanism, and in combinations thereof.

My invention further consists in a rearwardly-attached step, whereby the rider is enabled to mount and dismount with safety even while the vehicle is in motion, all as hereinafter fully described, illustrated in the drawings, and specifically pointed out in the claims.

Figure 2:
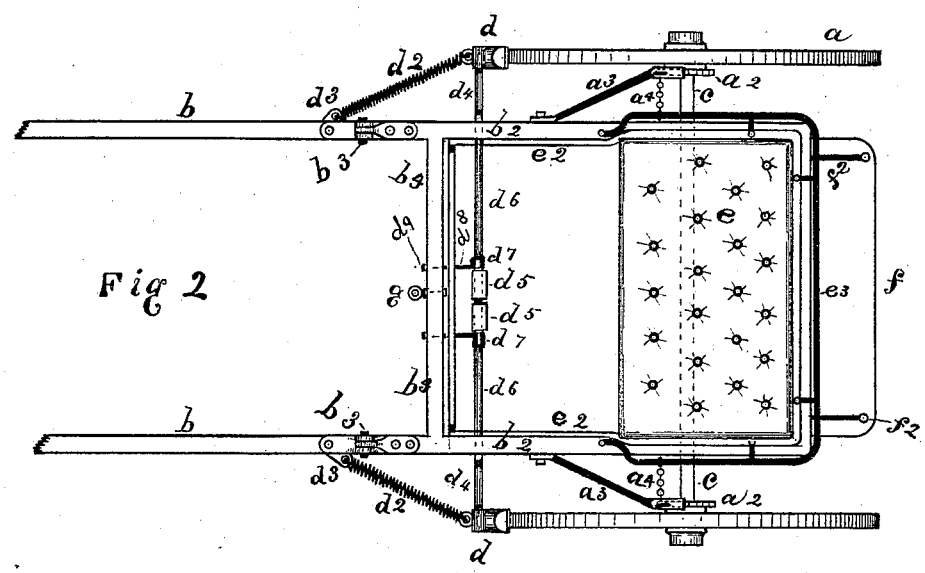
Figure 3:
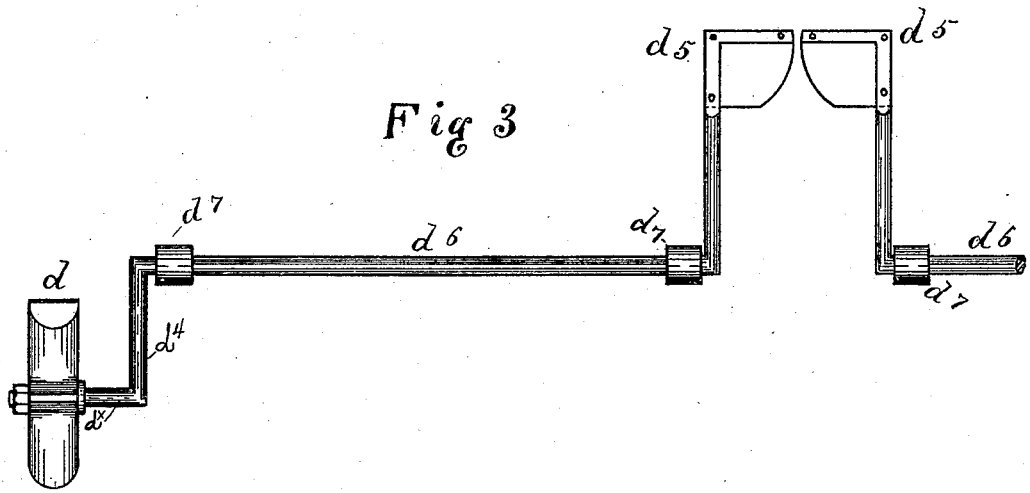
Figure 4:
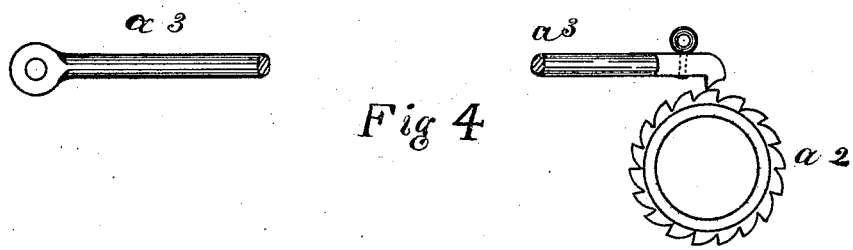

Referring to the accompanying drawings, in which like letters of reference point out similar parts on each figure, Figure 1 is a side elevation of the vehicle, illustrating my invention. Fig. 2 is a top plan view thereof. Fig. 3 is an enlarged detail view of the independent brake-operating mechanism. Fig. 4 is a detail view of the hub-ratchet and its dog or pawl.

In the drawings, $a$ is the vehicle-wheel; $a^2$, the hub-ratchet wheel; $a^3$, its dog or pawl.

$a^4$ represents a chain, by operation of which the dog is brought into engagement with and released from the ratchet-wheel.

$b$ is the shaft; $b^2$, an independent seat-frame hinged to the shafts at $b^3$.

$b^4$ is a cross-bar in the seat-frame. There is also a corresponding cross-bar connecting the shafts, onto which is a hook or suitable device for connecting thereto the whiffletree, shown at $e$ in the drawings.

$c$ is the axle.

$d$ is the brake-shoe; $d^2$, a spring controlling said brake-shoe.

$d^3$ is a lug or ear attached to the shaft, onto which is fastened one end of the spring $d^2$, the opposite end of which spring is fastened to an eye or any suitable device extending from the brake-shoe.

$d^4$ is the brake-shoe crank, extending outwardly on either side of the shafts, connected at one end to the brake-shoe. Said crank extends horizontally from the brake-shoe, forming a short arm, $d^x$, and is turned up therefrom, at right angles thereto, until it reaches the brake-shaft proper, $d^6$, said shaft and crank being formed integrally, as plainly shown in Fig. 3.

$d^7$ represents a sleeve surrounding the brake-shaft $d^6$, from which extends forwardly a short rod, $d^8$, which passes through an orifice in the shaft-bar $b^4$. Said rod is fastened thereto by nut $d^9$, the brake-shaft being free to turn within said sleeve for an obvious purpose.

$e$ is the vehicle-seat; $e^2$ being the seat-body; $e^3$, an iron seat or hand-rail.

$f$ is a step rearwardly adjusted to the body $e^2$ by brace-rods $f^2$.

Said seat-body is supported forwardly upon the shafts by hinges $b^3$, and rearwardly rests upon springs $i$, fixed upon an extension of the butt of the shafts near the axle. (See $b^5$, Fig. 1.)

From the foregoing description, in connection with the drawings, the nature and object of my invention and its operation will be fully understood by those familiar with the art to which my invention relates.

It will be seen that I provide for easy and efficient means for stopping a vehicle. The brake-shoe $d$ is normally kept away from the wheel-tire by action of the foot of the rider upon the pedals $d^5$, by which, through the crank $d^4$, the spring $d^2$ is retracted. When, however, the weight of the foot is withdrawn, it is obvious that the shoes $d$ will be immediately spring-pressed against the wheel-tires. Again, the pivoted dog $a^3$ is normally out of connection with the ratchets $a^2$, but upon being dropped will forthwith engage therewith and the vehicle be brought to a dead rest. The ratchet-wheel surrounds the main axle, being, in fact, an inward extension of the wheel-hub, and may be integral therewith, or a rigid attachment thereof.

The brake $d$ may be operated by the described mechanism concurrently with the dog and ratchet devices, or the two may be independently brought into action.

The object of the rearward step $f$ is to enable the rider to dismount without any risk of bodily harm, and said portion of my invention obviates the necessity of any foot-step on the forward part of the vehicle, the employment of which in such carriages is very inconvenient and frequently dangerous. Especially would this be the case in a vehicle provided with brake-springs and attachments constructed in accordance with my invention, into and with which there would be risk of the foot or clothing becoming entangled.

Having now fully described my invention, what I claim, and desire to secure by Letters Patent of the United States of America, is—

1. The spring-pressed brake-shoes $d$, connected forwardly to the shafts of a vehicle, each shoe being firmly adjusted to a crank, $d^1$, of a common bar, $d^6$, passing through bearings $d^7$ of rods $d^3$, attached to shaft cross-bar $b^4$, in combination with pedals $d^5$, substantially as described.

2. In a horse-breaking vehicle, the ratchets $a^2$, projecting inwardly from the wheel-hubs, in combination with pawls $a^3$, pivoted to the shafts and having separate operative chain $a^4$, whereby said pawls can be independently actuated, substantially as described.

FRANK P. McKEON.

Witnesses:
JOHN H. BOETLER,
NEO. DICKMAN.